US010095790B2

(12) United States Patent
Purusothaman et al.

(10) Patent No.: US 10,095,790 B2
(45) Date of Patent: Oct. 9, 2018

(54) CONTROL CENTER SYSTEM FOR SEARCHING AND MANAGING OBJECTS ACROSS DATA CENTERS

(71) Applicant: Payoda Inc., Plano, TX (US)

(72) Inventors: Anand Purusothaman, Jersey, NJ (US); Murali Palanisamy, Jersey, NJ (US)

( * ) Notice: Subject to any disclaimer, the term of this patent is extended or adjusted under 35 U.S.C. 154(b) by 325 days.

(21) Appl. No.: 14/798,738

(22) Filed: Jul. 14, 2015

(65) Prior Publication Data

US 2017/0017720 A1    Jan. 19, 2017

(51) Int. Cl.
*G06F 17/30* (2006.01)
*H04L 12/24* (2006.01)

(52) U.S. Cl.
CPC .. *G06F 17/30864* (2013.01); *G06F 17/30607* (2013.01); *G06F 17/30976* (2013.01); *G06F 17/30991* (2013.01); *H04L 41/0233* (2013.01); *H04L 41/22* (2013.01)

(58) Field of Classification Search
CPC ...................................................... G06F 17/30
See application file for complete search history.

(56) References Cited

U.S. PATENT DOCUMENTS

| 8,145,737 | B2* | 3/2012 | Nedelcu | H04L 41/12 707/600 |
| 2003/0130821 | A1* | 7/2003 | Anslow | H04L 41/12 702/186 |
| 2010/0122175 | A1* | 5/2010 | Gupta | H04L 41/22 715/735 |
| 2012/0317491 | A1* | 12/2012 | Wong | H04L 41/22 715/736 |

* cited by examiner

*Primary Examiner* — Khanh B Pham
(74) *Attorney, Agent, or Firm* — The Law Office of Austin Bonderer, PC; Austin Bonderer

(57) ABSTRACT

A centralized control center system for searching and managing one or more objects on granular object level in one or more datacenters is provided. The control center system includes a memory unit, and a processor. The memory unit stores a database and a set of modules. The processor executes the set of modules. The set of modules includes a search module, a topology view module, and an orphan object visibility module. The search module is configured to search and retrieve the one or more objects based on a search query. The topology view module is configured to display the one or more objects connected to the one or more datacenters in a hierarchy. The orphan object visibility module is configured to display (i) an object without a parent object, and (ii) a pool without a parent pool.

9 Claims, 12 Drawing Sheets

| | | | | Admin | Logout |
|---|---|---|---|---|---|
| Dashboard | Control Center | | | | |
| Ctrl Center | Search... | | | | |
| Certificate | ADC (20) | Firewall (50) | Cert (15) | DNS (03) | |
| Device | PARENT OBJECT | | CHILD 1 | | CHILD 2 |
| APS | ○ appviewx.com<br>4 Pools, 1 Pool Members | | ○ *testpool1(1) | | ○ /Common/widepoolmemberforv... |
| Config | ○ automationobjreadonlywid...<br>2 Pools, 1 Pool Members | | ○ testwildcard(1) | | ○ 192.168.12.192.80... ○ 192.168.12.192.80... ○ 192... |
| Account | ○ automationobjrwdiswiden...<br>2 Pools, 1 Pool Members | | ○ wideippoolwildcard(1) | | ○ 192.168.12.192.80... ○ 192.168.12.192.80... ○ 192... |
| Report | ○ automationobjrwenwidep...<br>0 Pools, 1 Pool Members | | - | | ○ 192.168.12.192.80... ○ 192.168.12.192.80... ○ 192... |
| Alert | ○ controlcentertag87gtm.com<br>1 Pools, 8 Pool Members | | ○ widyuepoolforvip(8) | | ○ 192.168.12.192.80... ○ 192.168.12.192.80... ○ 192... |
| Security | ○ testwip.com<br>0 Pools, 2 Pool Members | | - | | ○ /Common/yetWilca... |
| | ○ controlcentertag87gtm.com<br>1 Pools, 1 Pool Members | | ○ yettforSearchWildCard(1) | | ○ /Common/NodeAuto... |
| | ○ testwip.com<br>1 Pools, 0 Pool Members | | ○ yetWildCardpool(0) | | ○ /Common/81Automati... |
| | | | | | 52 « < 1 2 3 » » |

| Control Center | | | | | | Admin \| Logout |
|---|---|---|---|---|---|---|
| Common Name : * | | | | | | |
| ADC (20) | Firewall (50) | Cert (15) | | DNS (03) | | |
| Common Name ▲▼ | Cert Group ▲▼ | Valid To ▲▼ | Status ▲▼ | Key Algorithm & Size ▲▼ | Compliance | |
| Microsoft123 | Ecom | 21/4/2015 | New Certificate | RSA 2048 bits | Non-Associated | |
| test1.payoda.com | Admin | 20/3/2015 | Managed | RSA 1024 bits | Non-Associated | |
| Loga cert1 | Loga | 13/1/2015 | New Certificate | EC 256 bits | Non-Associated | |
| Microsoft456 | Ecom | 21/4/2015 | New Certificate | RSA 2048 bits | Non-Associated | |
| test2.payoda.com | Admin | 20/3/2015 | Managed | RSA 1024 bits | Non-Associated | |
| Loga cert2 | Loga | 13/1/2015 | New Certificate | EC 256 bits | Non-Associated | |
| Microsoft789 | Ecom | 21/4/2015 | New Certificate | RSA 2048 bits | Non-Associated | |
| test3.payoda.com | Admin | 20/3/2015 | Managed | RSA 1024 bits | Non-Associated | |
| Loga cert3 | Loga | 13/1/2015 | New Certificate | EC 256 bits | Non-Associated | |
| Microsoft321 | Ecom | 21/4/2015 | New Certificate | RSA 2048 bits | Non-Associated | |
| test5.payoda.com | Admin | 20/3/2015 | Managed | RSA 1024 bits | Non-Associated | |
| Loga cert4 | Loga | 13/1/2015 | New Certificate | EC 256 bits | Non-Associated | |
| Microsoft654 | Ecom | 21/4/2015 | New Certificate | RSA 2048 bits | Non-Associated | |
| test6.payoda.com | Admin | 20/3/2015 | Managed | RSA 1024 bits | Non-Associated | |

704 — 706 — 708 — 710 — 712

Dashboard / Ctrl Center / Certificate / Device / APS / Config / Account / Report / Alert / Security

FIG. 7

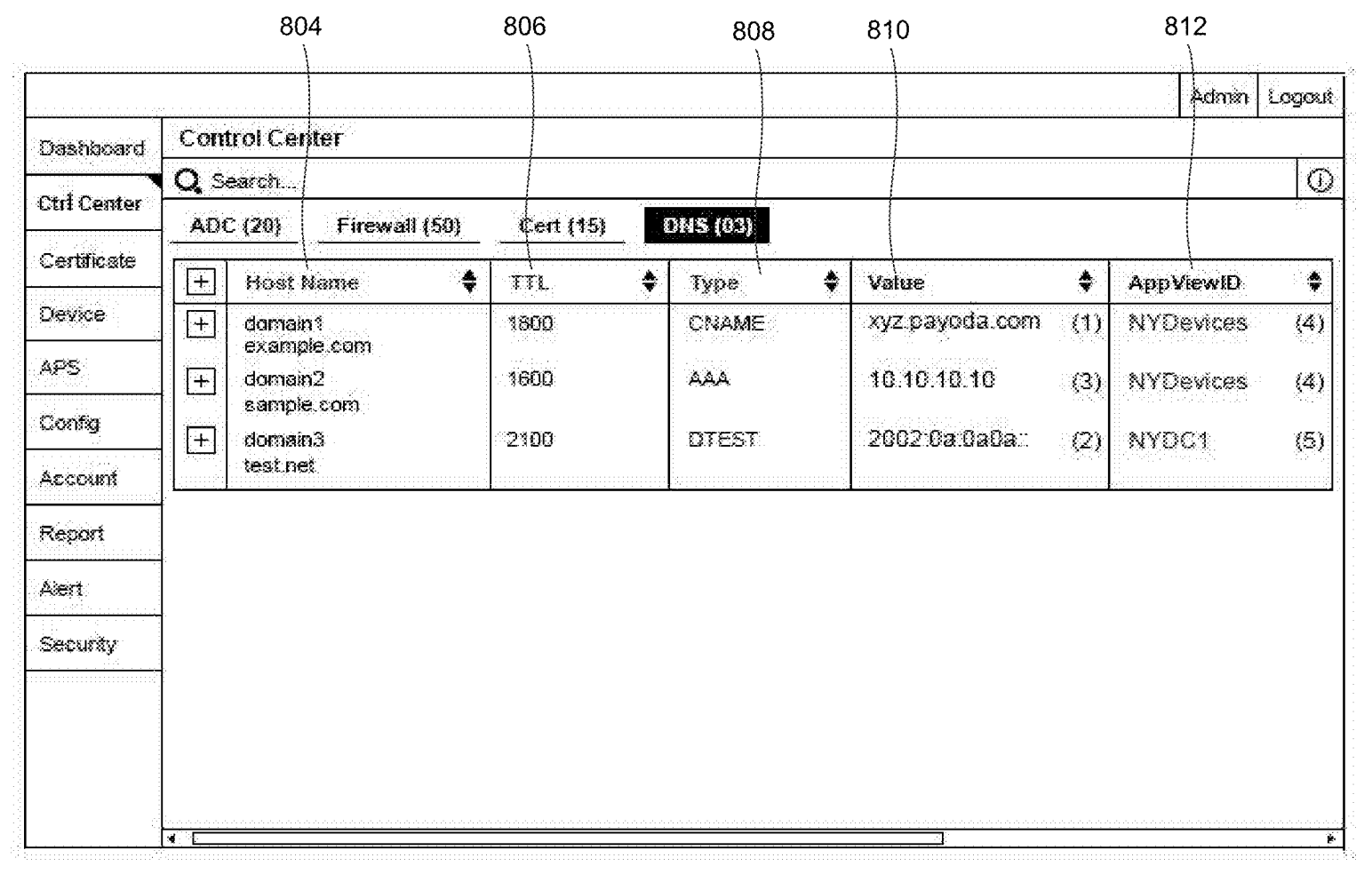

| Control Center | | | | |
|---|---|---|---|---|
| Q Search... | | | | |
| ADC (20) | Firewall (50) | Cert (15) | DNS (03) | |
| Host Name | TTL | Type | Value | AppViewID |
| + domain1 example.com | 1800 | CNAME | xyz.payoda.com (1) | NYDevices (4) |
| + domain2 sample.com | 1600 | AAA | 10.10.10.10 (3) | NYDevices (4) |
| + domain3 test.net | 2100 | DTEST | 2002:0a:0a0a... (2) | NYDC1 (5) |

FIG. 8

CONTROL CENTER SYSTEM FOR SEARCHING AND MANAGING OBJECTS ACROSS DATA CENTERS

BACKGROUND

Technical Field

The embodiments herein generally relate to an information retrieval system, and more particularly, to a system and method for searching and managing one or more objects on a consolidated platform across data centers.

Description of the Related Art

Managing and searching objects (e.g., devices, objects of devices, DNS, certificates) in networks are critical for application owners and network administrators. Existing legacy tools are not supported by development teams, as there are multiple different tools with each of them running on independent scripts. Collaboration among the tools is essential for the efficient functioning of a system. Existing applications are also independent of each another with access restricted to concerned independent teams. Thus, an unreasonable amount of time and resources are spent on writing scripts every time when a team needs to monitor applications outside its scope of access. Also there is no single-view visibility of an application across networking components running across multiple data centers to search and manage objects, such as devices, DNS, certificates, etc.

Device/object level operations on management tools makes routing traffic amongst data centers difficult and unnecessarily complex. This also amplifies the risk of errors and difficulties in setting up and altering rules to serve traffic. Monitoring applications, studying statistics and gauging the health of applications are highly complex in existing systems. An increased number of independent tools render migration/upgrading of network tools almost impossible. Also, fixing issues consumes time, which is very critical in industries like banking, healthcare, etc., where data management is critical. The most common solutions for device management are provided by device vendors themselves. However, these solutions monitor the devices and give a device-centric view of the network, which does not meet the requirements of application owners, network administrators, and CXOs to monitor network components.

Accordingly, there is a need for a system to search and manage one or more objects (e.g., a rule/policy of a firewall device, a certificate, a domain name system (DNS) record, an application delivery controller (ADC) device, and objects of the ADC device) across data centers.

SUMMARY

In view of the foregoing, an embodiment herein provides a centralized control center system for searching and managing one or more objects on granular object level in one or more datacenters. The control center system includes a memory unit, and a processor. The memory unit stores a database and a set of modules. The processor executes the set of modules. The set of modules includes a search module, a topology view module, and an orphan object visibility module. The search module, executed by the processor, is configured to search and retrieve the one or more objects based on a search query. The topology view module, executed by the processor, is configured to display the one or more objects connected to the one or more datacenters in a hierarchy. The an orphan object visibility module, executed by the processor, is configured to display (i) an object without a parent object, and (ii) a pool without a parent pool.

In one embodiment, the one or more objects includes at least one of (i) an object of the ADC device, (ii) a rule/policy of the firewall device, (iii) a certificate, and (iv) a domain name system (DNS) record. In another embodiment, the search module includes an ADC support module, a firewall support module, a certificate support module, and a DNS support module. The ADC support module, executed by the processor, is configured to search and retrieve one or more objects associated with one or more ADC devices based on the search query. The firewall support module, executed by the processor, is configured to search and retrieve at least one of (i) one or more rules, and (ii) one or more policies associated with firewall devices based on the search query. The certificate support module, executed by the processor, is configured to search and retrieve one or more certificates based on the search query. The DNS support module, executed by the processor, is configured to search and retrieve one or more DNS records based on the search query. In yet another embodiment, when an object of an ADC device is selected from the one or more objects associated with the one or more ADC devices. The topology view module displays at least one of (i) a parent object, (ii) a first child of the parent object, and (iii) a second child of the parent object associated with the selected object of the ADC device in a hierarchy. In yet another embodiment, the ADC support module is configured to perform one or more actions on the selected object of the ADC device on granular object level. The one or more actions includes at least one of: (i) enabling the selected object of the ADC device, (ii) disabling the selected object of the ADC device, (iii) viewing configurations of the selected object of the ADC device, (iv) backing up and restoring the selected object of the ADC device, and (v) tagging the selected object of the ADC device to an application ID to manage the selected object of the ADC device. The ADC support module may be configured to back up and restore the ADC device. In yet another embodiment, the firewall support module is configured to provide details of the one or more rules from managed policies associated with the firewall devices. The details of the one or more rules includes on at least one of (i) a rule name, (ii) a source network object (e.g., IP, Netmask, Range, fully qualified domain name, Dynamic) of a rule, (iii) a destination network object (e.g., IP, Netmask, Range, fully qualified domain name, Dynamic) of a rule, (iv) an application/services, (v) an action taken on a rule, (vi) log settings of a rule, (vii) details of installation of a rule/policy in a firewall device, (viii) a policy name of a rule, and (ix) an application ID of a rule. In yet another embodiment, the firewall support module is configured to tag (i) the one or more rules, and (ii) the one or more policies that match the search query to an application ID to manage the one or more rules, and the one or more policies. In yet another embodiment, the certificate support module is configured to search and retrieve the one or more certificates based on at least one of (i) a common name of a certificate, and (ii) a subject alternate name of a certificate. In yet another embodiment, the certificate support module is configured to provide details of the one or more certificates. The details of the one or more certificates includes at least one of (i) a common name of a certificate, (ii) a certificate group of the certificate, (iii) validity details of the certificate, (iv) a status of the certificate, (v) a key algorithm and size of the certificate, and (vi) a compliance status of the certificate. In yet another embodiment, when a certificate is selected from the one or more certificates, the certificate support module displays a holistic view of the selected certificate. The holistic view includes at least one of (a) a chain structure of the selected certificate, and (b) device details of the selected certificate. In yet another embodiment, the control center system includes a search information module, executed by the processor, is configured to provide hints to optimize the search query to retrieve the search results. In yet another embodiment, the search information module includes (i) a full text search field, (ii) a keyword search field, (iii) a logical operator search field, and (iv) a frequent search field to provide the hints to optimize the search query.

In another aspect, a non-transitory program storage device readable by computer that includes a program of instructions executable by the computer to perform a method for searching and managing one or more objects on granular object level in one or more datacenters is provided. The one or more objects includes at least one of (i) one or more objects associated with one or more ADC devices, (ii) one or more rules, or one or more policies associated with firewall devices, (iii) one or more certificates, and (iv) one or more domain name system (DNS) records. The method includes following steps: (i) searching at least one of (a) the one or more objects associated with the one or more ADC devices, (b) the one or more rules, or the one or more policies associated with the firewall devices, (c) the one or more certificates, and (d) the one or more domain name system (DNS) records based on a search query; (ii) retrieving at least one of (a) the one or more objects associated with the one or more ADC devices, (b) the one or more rules, or the one or more policies associated with the firewall devices, (c) the one or more certificates, and (d) the one or more domain name system (DNS) records based on the search query; (iii) selecting an object from at least one of (a) the one or more objects associated with the one or more ADC devices, (b) the one or more rules, or the one or more policies associated with the firewall devices, (c) the one or more certificates, and (d) the one or more domain name system (DNS) records to display a topology view of the selected object; and (iv) performing one or more actions on the selected object to manage the selected object.

In one embodiment, the one or more actions includes at least one of: (i) enabling the selected object, (ii) disabling the selected object, (iii) viewing configurations of the selected object, (iv) backing up and restoring the selected object, and (v) tagging the selected object to an application ID to manage the selected object. The method may include the step of backing up and restoring the ADC device. In another embodiment, the method further includes displaying at least one of (i) a parent object, (ii) a first child of the parent object, and (iii) a second child of the parent object associated with an object of an ADC device in a hierarchy when the object of the ADC device is selected from the one or more objects associated with the one or more ADC devices. In yet another embodiment, the method further includes displaying a holistic view of a certificate when the certificate is selected from the one or more certificates. The holistic view includes at least one of (a) a chain structure of the selected certificate, and (b) device details of the selected certificate.

In yet another aspect, a computer implemented method for searching and managing one or more objects on granular object level in one or more datacenters is provided. The one or more objects includes at least one of (i) one or more objects associated with one or more ADC devices, (ii) one or more rules, or one or more policies associated with firewall devices, (iii) one or more certificates, and (iv) one or more domain name system (DNS) records. The method includes following steps: (i) searching at least one of (a) the one or more objects associated with the one or more ADC devices, (b) the one or more rules, and the one or more policies associated with the firewall devices, (c) the one or more certificates, and (d) the one or more domain name system (DNS) records based on a search query; (ii) retrieving at least one of (a) the one or more objects associated with the one or more ADC devices, (b) the one or more rules, or the one or more policies associated with the firewall devices, (c) the one or more certificates, and (d) the one or more domain name system (DNS) records based on the search query; (iii) selecting an object from at least one of (a) the one or more objects associated with the one or more ADC devices, (b) the one or more rules, or the one or more policies associated with the firewall devices, (c) the one or more certificates, and (d) the one or more domain name system (DNS) records to display a topology view of the selected object; and (iv) performing one or more actions on the selected object to manage the selected object. The one or more actions includes at least one of: (a) enabling the selected object, (b) disabling the selected object, (c) viewing configurations of the selected object, (d) backing up and restoring the selected object, and (e) tagging the selected object to an application ID to manage the selected object. The computer implemented method may further include the step of backing up and restoring the ADC device.

In one embodiment, the computer implemented method further includes displaying at least one of (i) a parent object, (ii) a first child of the parent object, and (iii) a second child of the parent object associated with an object of an ADC device in a hierarchy when the object of the ADC device is selected from the one or more objects associated with the one or more ADC devices. In another embodiment, the computer implemented method further includes displaying a holistic view of a certificate when the certificate is selected from the one or more certificates. The holistic view includes at least one of (a) a chain structure of the selected certificate, and (b) device details of the selected certificate.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 4 illustrates a user interface view of an application delivery controller (ADC) support module of FIG. 2 according to an embodiment herein;

FIG. 6A and FIG. 6B illustrate user interface views of a firewall support module of FIG. 2 according to an embodiment herein;

FIG. 7 illustrate a user interface view of a certificate support module of FIG. 2 according to an embodiment herein;

FIG. 8 illustrate a user interface view of a DNS support module of FIG. 2 according to an embodiment herein;

DETAILED DESCRIPTION OF PREFERRED EMBODIMENTS

Figure 1:
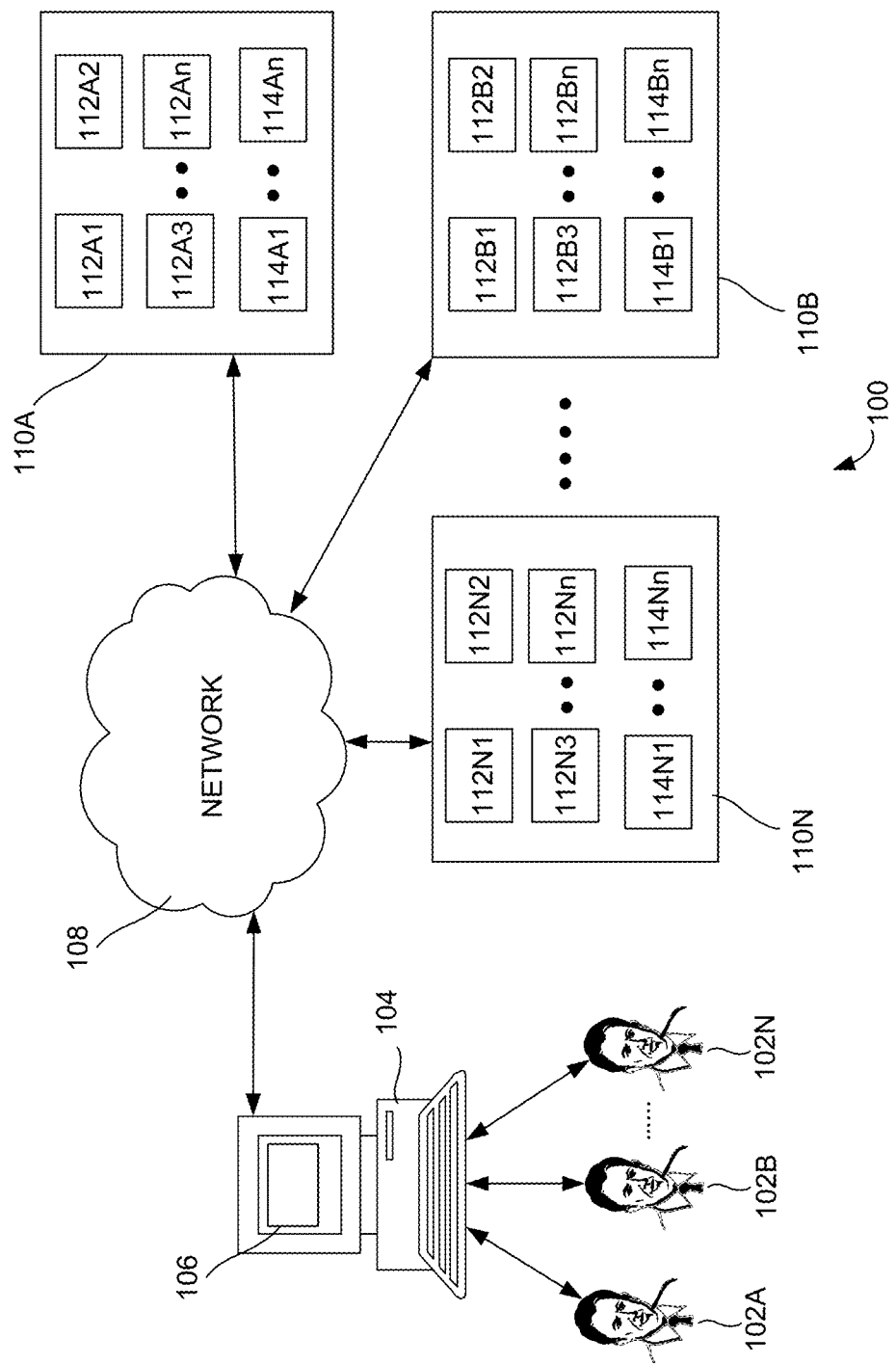
FIG. 1 illustrates a system view of one or more users communicating with a user system to search and manage one or more objects across one or more datacenters using a control center system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the methods and systems disclosed herein provide a control center system that searches and manages one or more objects on granular object level across one or more datacenters. The control center system performs one or more actions, such as, searching the one or more objects, retrieving the one or more objects, and managing the one or more objects (e.g., a rule/policy of a firewall device, a certificate, a domain name system (DNS) record, an application delivery controller (ADC) device, and objects of the ADC device) on granular object level. Referring now to the drawings, and more particularly to FIGS. 1 through 11, where similar reference characters denote corresponding features consistently throughout the figures, there are shown preferred embodiments.

FIG. 1 illustrates a system view 100 of one or more users 102A-N communicating with a user system 104 to search and manage one or more objects 112A1-Nn across one or more datacenters 110A-N using a control center system 106 according to an embodiment herein. The control center system 106 provides a user interface to the one or more users 102A-N to search and manage the one or more objects 112A1-Nn across the one or more datacenters 110A-N on granular object level. The granular object level may include object attributes for authorized functions, and/or access control for properties of the one or more objects 112A1-Nn. In one embodiment, the one or more objects 112A1-Nn includes a firewall device, a rule/policy of the firewall device, a certificate, a domain name system (DNS) record, an application delivery controller (ADC) device, and objects of the application delivery controller device. In another embodiment, the one or more objects 112A1-Nn includes a BIG IP device from F5 networks, ACE—Application Control Engine from Cisco, and Netscaler from Citrix etc. Firewall (Checkpoint, Palo alto). The one or more datacenters 110A-N includes one or more IP servers 114A1-Nn. In one embodiment, the one or more IP servers 114A1-Nn are called as a domain server.

The control center system 106 provides a user interface to the one or more users 102A-N to search for the objects categories (i.e. objects of application delivery controller (ADC) devices, rules of firewall devices, DNS records, and/or certificates) that are supported and managed within an application inventory. The control center system 106 provides a user interface to the one or more users 102A-N to provide a search criteria/query, such as free text entity, keywords, logical operators with auto suggestions, based on which the search is performed. The search results that are related to the search criteria are displayed in a tab view (e.g. an application delivery controller (ADC) tab, a firewall tab, a DNS tab, and a certificate tab) for each objects categories (i.e. objects of application delivery controller (ADC) devices, rules of firewall devices, DNS records, and/or certificates). In one embodiment, the control center system 106 provides a user interface to the one or more users 102A-N to search the one or more objects 112A1-Nn (i.e. objects of application delivery controller (ADC) devices, rules of firewall devices, DNS records, and/or certificates) using natural language as a search query. In another embodiment, the control center system 106 provides frequently searched details (e.g., a search criteria/query) to the one or more users 102A-N when the one or more users 102A-N provide a search query in a search tab. The control center system 106 provides a user interface to the one or more users 102A-N to perform one or more actions on the one or more objects 112A1-Nn (e.g. objects of the ADC device, a rule/policy of the firewall device, a DNS record, and a certificate) that are listed in the tabs (e.g. an application delivery controller (ADC) tab, a firewall tab, a DNS tab, and a certificate tab) as search results. In one embodiment, the one or more actions include add/remove application id (e.g., an Appview ID), enabling/disabling the objects of the ADC devices, create/modify/delete the DNS record (e.g. IP changes to a DNS record), updating the rules of the firewall devices, view alerts/logs, and etc. In another embodiment, the one or more actions are performed on the one or more objects 112A1-Nn on granular object level.

Figure 2:
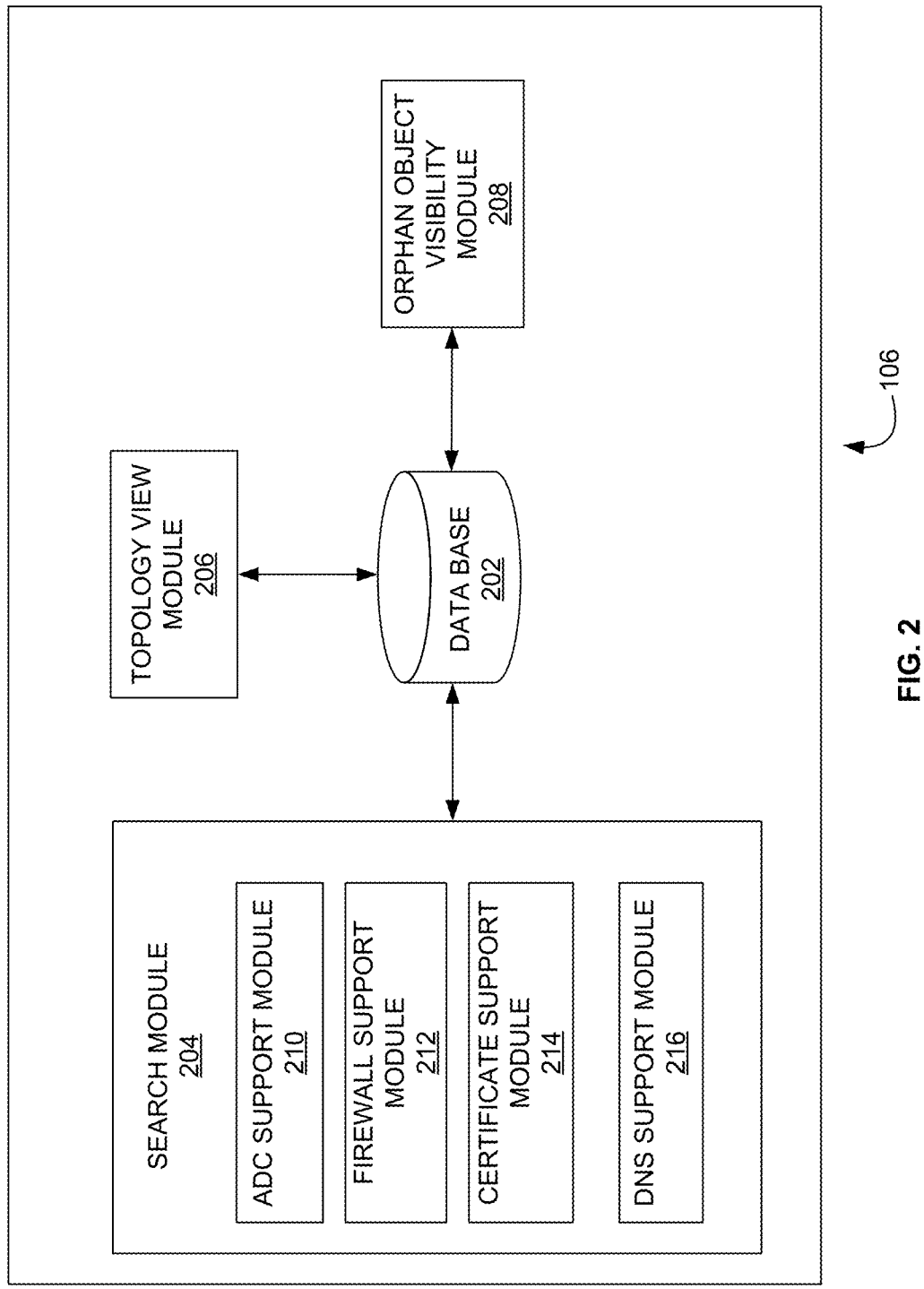
FIG. 2 illustrates an exploded view of the control center system of FIG. 1 according to an embodiment herein.

FIG. 2 illustrates an exploded view of the control center system 106 of FIG. 1 according to an embodiment herein. The control center system 106 includes a database 202, a search module 204, a topology view module 206, and an orphan object visibility module 208. The search module 204 is configured to search and retrieve the one or more objects 112A1-Nn across the one or more datacenters 110A-N based on a search query. In one embodiment, the search module 204 further includes an application delivery controller (ADC) support module 210, a firewall support module 212, and a certificate support module 214, and a domain name system (DNS) support module 216. The ADC support module 210 is configured to search and retrieve objects of the ADC devices based on the search query. In one embodiment, the ADC support module 210 is configured to perform one or more actions on an object of the ADC device on granular object level. The one or more actions includes (i) enabling the object of the ADC device, (ii) disabling the object of the ADC device, (iii) viewing configurations of the object of the ADC device, (iv) backing up and restoring the object of the ADC device, and (v) tagging the object of the ADC device to an application ID to manage the object ADC device. The ADC support module 210 may be configured to back up and restore the ADC device. The firewall support module 212 is configured to search and retrieve at least one of (i) one or more rules, and (ii) one or more policies of firewall devices based on the search query. In one embodiment, the firewall support module 212 is configured to provide details of the one or more rules inside a policy of the firewall devices as follows: (i) a rule name, (ii) source/destination network objects (e.g., IP, Netmask, Range, fully qualified domain name, Dynamic, single network object, multiple network objects, or group of network objects) of a rule, (iii) an application ID of a rule, (iv) an application/services (e.g., single service, multiple services, or group of services), (v) action taken on a rule, (vi) log settings of a rule, (vii) details of installation of a rule/policy in a firewall device, and (viii) a policy name of the rule. In another embodiment, the firewall support module 212 is configured to provide details of the one or more rules inside a policy of the firewall devices such as source zone of the rule, source user of the rule, destination zone of the rule, profile information of the rule, profile type of the rule, context name of the rule, description of the rule, schedule profile information of the rule, vendor of the rule, target device of the rule. In yet another embodiment, the firewall support module 212 is further configured to tag the one or more rules, and the one or more policies that match the search query to an application ID to manage the one or more rules, and the one or more policies. The certificate support module 214 is configured to search and retrieve one or more certificates based on the search query. In one embodiment, the certificate support module 214 is configured to search and retrieve the one or more certificates based on at least one of (i) a common name of a certificate, and (ii) a subject alternate name of a certificate. In another embodiment, the certificate support module 214 is configured to display details of the one or more certificates. The details of the one or more certificates includes at least one of: (i) a common name of a certificate, (ii) a certificate group of a certificate, (iii) validity details of a certificate, and (iv) a status of a certificate, (v) a key algorithm and size of a certificate, and (vi) a compliance status of a certificate. In one embodiment, when a certificate is selected from the one or more certificates that are listed in the certificate tab, the certificate support module 214 displays a holistic view of at least one of (a) a chain structure of the selected certificate, and (b) device details of the selected certificate. The domain name system (DNS) support module 216 is configured to search and retrieve one or more DNS record based on the search query. The DNS support module 216 is configured to display details of the one or more DNS records. In one embodiment, the details of the one or more DNS record includes at least one of: (i) a host name of a DNS record, (ii) Time to Live (TTL) of the DNS record, (iii) a type of the DNS record, and (iv) a value of the DNS record, and (v) an application ID for the DNS record. In one embodiment, the DNS support module 216 is configured to provide a grid view of the DNS record (i.e. chain structure and/or a device details) when the one or more users 102A-N select at least one DNS record from the search results (i.e. a list of DNS records in the DNS tab). The topology view module 206 is configured to display the one or more objects 112A1-Nn which is connected across the one or more datacenters 110A-N in a hierarchy. In one embodiment, when an object of the ADC device is selected from the search result, the topology view module 206 displays at least one of (i) a parent object, (ii) a first child of the parent object, and (ii) a second child of the parent object associated with the selected object of the ADC device in a hierarchy. The orphan object visibility module 208 is configured to display (i) an object without a parent object, and (ii) a pool without a parent pool. In one embodiment, the database 102 stores information related to frequently searched one or more objects 112A1-Nn and queries. The control center system 106 further includes a search information module that is configured to provide hints to optimize the search query to retrieve the search results. In one embodiment, the search information module includes (i) a full text search field, (ii) a keyword search field, (iii) a logical operator search field, and (iv) a frequent search field to provide the hints.

Figure 3:
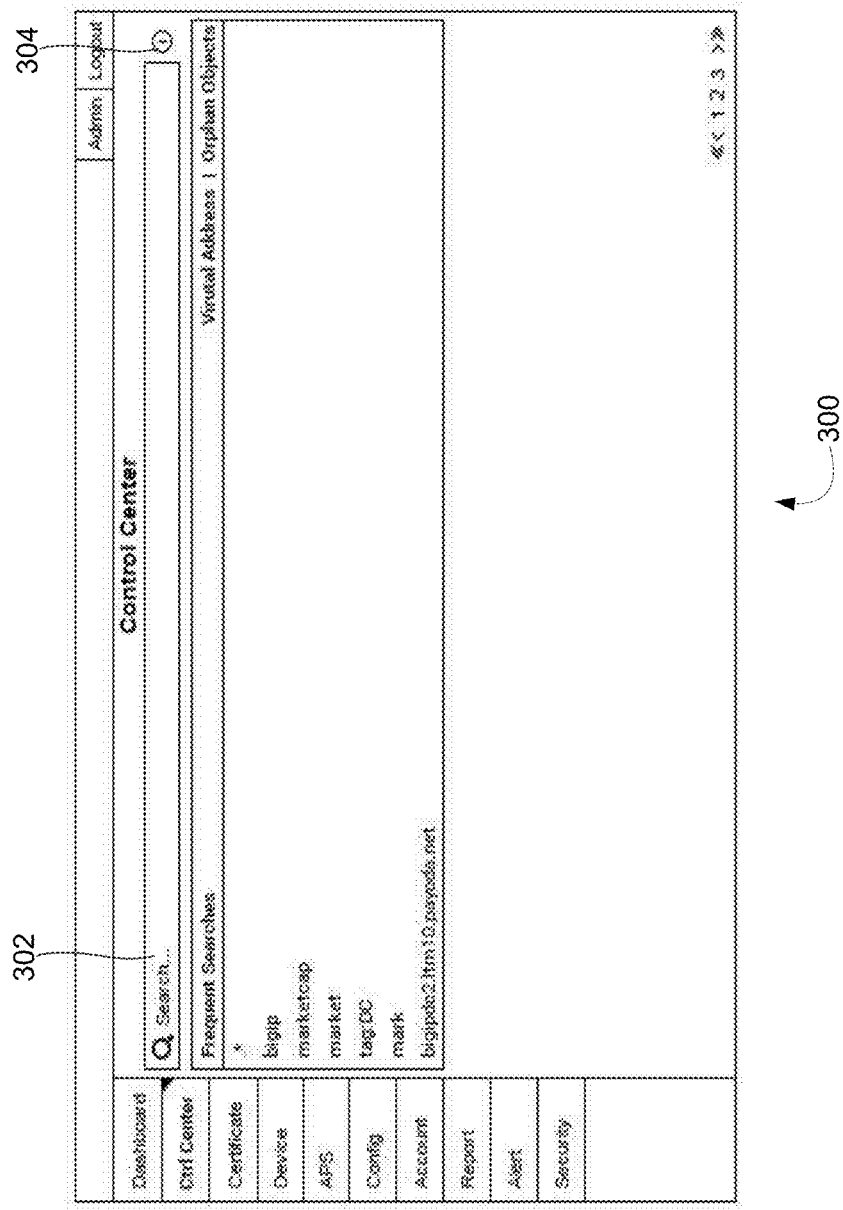
FIG. 3 illustrates a user interface view of a search module of FIG. 2 according to an embodiment herein.

FIG. 3 illustrates a user interface view 300 of the search module 204 of FIG. 2 according to an embodiment herein. The user interface view 300 includes a search tab 302, and a search information tab 304. The search tab 302 is configured to provide an option to the one or more users 102A-N to search the one or more objects 112A1-Nn (i.e. objects of the ADC device, a rule/policy details of the firewall devices, a DNS record, and a certificate) across the one or more datacenters 110A-N. The search information tab 304 is configured to provide hint to optimize a search criteria in order to obtain better search results. In one embodiment, the search information tab 304 includes a full text search field, a keyword search field, a logical operator search field, and a frequent search field to provide hints. The full text search field is configured to search for a specific word, an object/device name across the one or more datacenters 110A-N. The keyword search field is configured to filter the search using keywords to obtain better search results. In one embodiment, the keywords include a device/an object name, a virtual server port, a virtual server name, a pool name, a pool monitor (PM), a PM name, a PM internet protocol (IP), a PM port, a PM monitor, a rule, and a profile. The logical operator search field is configured to filter the search using logical operators (for e.g., AND, OR, NOT, !, −, +) for better search results. In another embodiment, the keywords include an IP, a display name, a virtual address, an application ID, a virtual server, a virtual service, a profiles, a rule, a fully qualified domain name (FQDN), an aflex, a monitor, a template, a policy, and a server. In yet another embodiment, the keywords include a host name, a zone name, and value of DNS record. The frequent search field is configured to display the frequently searched applications/objects/keywords. The user interface view 300 further includes an application delivery controller (ADC) tab, a firewall tab, a DNS tab, and a certificate tab (not shown in FIG.).

FIG. 4 illustrates a user interface view 400 of the application delivery controller (ADC) support module 210 of FIG. 2 according to an embodiment herein. The user interface view 400 of the ADC support module 210 is configured to display a list of objects of the ADC devices, as the search results, based on the given search criteria/query. The user interface view 400 includes a parent object field 402, a first child field 404, and a second child field 406. The user interface view 400 provides a user interface to the one or more users 102A-N to search for a Virtual Internet Protocol (VIP)/Wide Internet Protocol (WIP) objects such as a pool, a pool member, or server node details of the ADC device. In one embodiment, the user interface view 400 displays a list of objects of the ADC devices in a hierarchical view, as a first source of information. In another embodiment, when the one or more users 102A-N selects an object of the ADC device from the list of objects of the ADC devices (i.e. search results), a topological view of the selected object of the ADC device is displayed in the user interface view 400. In one embodiment, the ADC support module 210 identifies a parent object and one or more child objects (e.g. a first child object and a second child object) associated with the selected object of the ADC device by analysing objects of the ADC devices across one or more data centers. The parent object field 402 displays a parent object of each of the objects of the ADC device listed in the search results. The first child field 404 displays a first child of the parent object for each of the objects of the ADC device listed in the search results. The second child field 406 displays a second child of the parent object for each of the objects of the ADC device listed in the search results. In one embodiment, the parent object includes N no. of child.

In one embodiment, the user interface 400 provides an option to the one or more users 102A-N to perform at least one of the following actions on granular object level: (i) enabling an object of the ADC device, (ii) disabling an object of the ADC device, (iii) view configurations of an object of the ADC device, (iv) backing up and restoring an object of the ADC device, and (v) tagging an object of the ADC device to the application ID (e.g., an AppView ID) to manage the object of the ADC device. The user interface 400 may further provide an option to the one or more users 102A-N to back up and restore the ADC device.

Figure 5:
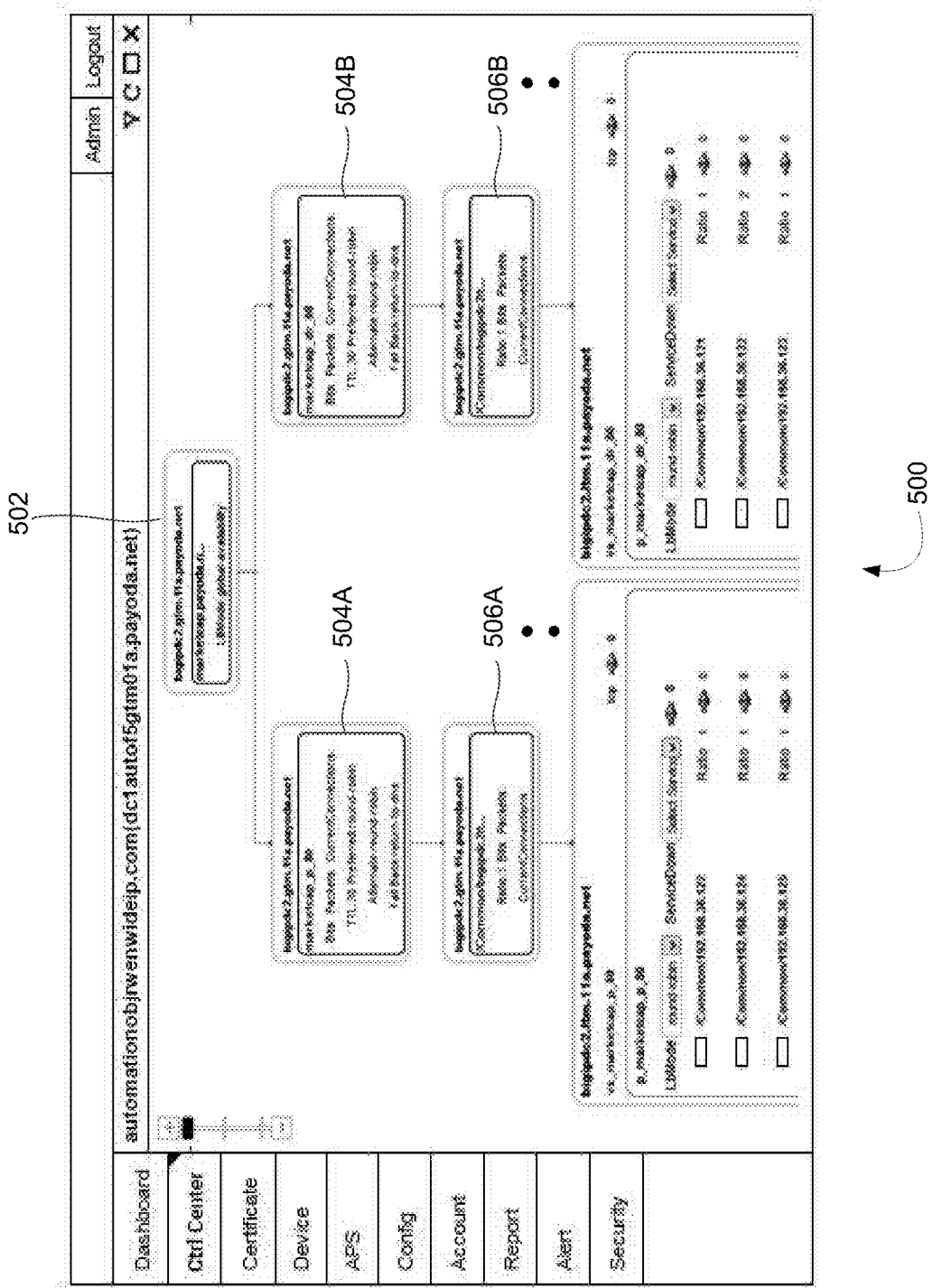
FIG. 5 illustrates a topology view of an object of the ADC device according to an embodiment herein.

With reference to FIG. 4, FIG. 5 illustrates a topology view 500 of an object of the ADC device according to an embodiment herein. When the one or more users 102A-N selects an object of the ADC device from the search results (i.e. a list of objects of the ADC device), the topology view 500 displays the selected object of the ADC device in a hierarchical view, as a first source of information. The topology view 500 displays a parent object 502 of the selected object of the ADC device, one or more first child 504 A-B of the selected object of the ADC device, and one or more second child 506 A-B of the selected object of the ADC device. The topology view 500 is generated by mapping the parent object 502 and the one or more first child 504 A-B and the one or more second child 506 A-B with the selected object of the ADC device in a hierarchy (as shown in FIG.). In one embodiment, the topology view 500 displays nodes and pools of the selected object of the ADC device in a hierarchy. In another embodiment, when an object of the ADC device is selected from the search results (i.e. the list of ADC devices, or object of the ADC device), a topology view of the selected object of the ADC device is displayed to the one or more user's 102A-N.

Figure 6A:
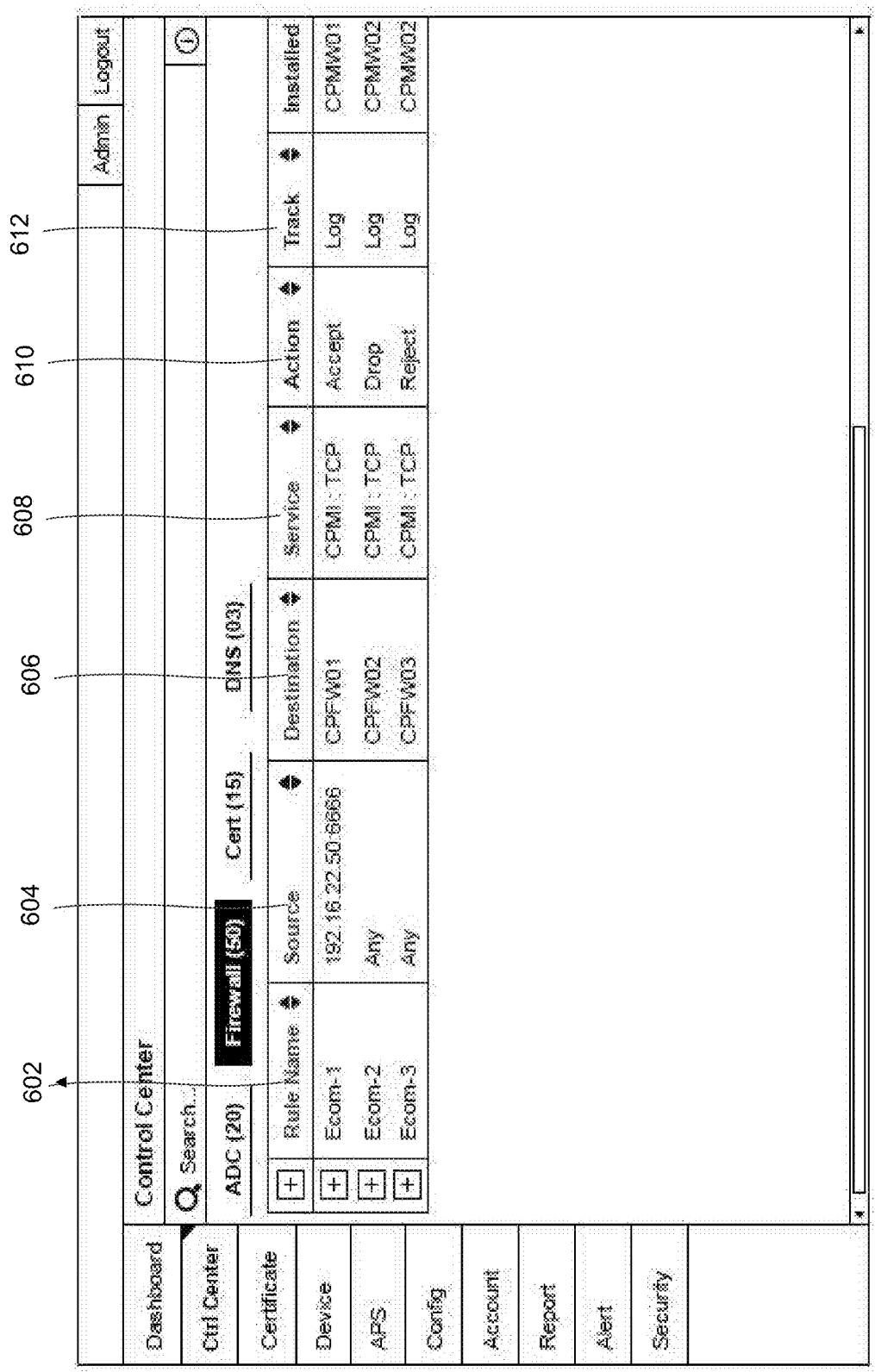
Figure 6B:
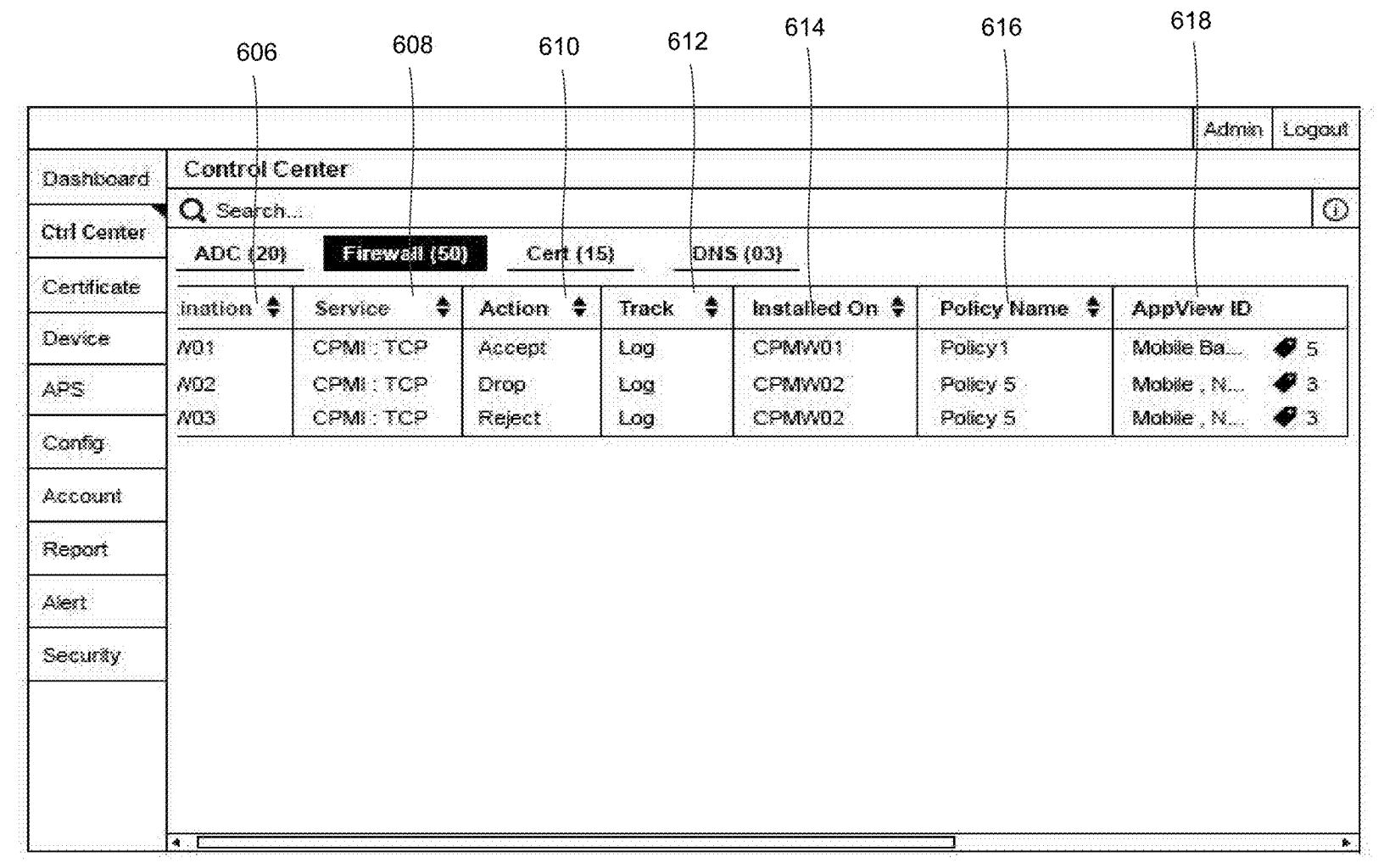

FIG. 6A and FIG. 6B illustrate user interface views of the firewall support module 212 according to an embodiment herein. The user interface views of the firewall support module 212 provide an option to the one or more user's 102A-N to search a rule/a policy based details within a firewall device. The user interface views of the firewall support module 212 are configured to display the search results (i.e. rules inside a policy from the firewall devices) based on a search query, through the firewall tab. The user interface views of the firewall support module 212 include details of a rule of a firewall device as follows: (i) a rule name 602, (ii) a source network object (e.g., IP, Netmask, Range, fully qualified domain name, Dynamic, single network object, multiple network objects, or group of network objects) of the rule 604, (iii) a destination network object (e.g., IP, Netmask, Range, fully qualified domain name, Dynamic, single network object, multiple network objects, or group of network objects) of the rule 606, (iv) applications/services (e.g., single service, multiple services, or group of services) 608, (v) an action taken on the rule 610, (vi) log settings of the rule 612, (vii) details of installation of the rule/policy in the firewall device 614, (viii) a policy name of the rule 616, and (ix) an application ID (e.g.,  AppView ID) of the rule 618. In one embodiment, the user interface views of the firewall support module 212 is configured to provide details of the rule inside a policy of the firewall devices such as source zone of the rule, source user of the rule, destination zone of the rule, profile information of the rule, profile type of the rule, context name of the rule, description of the rule, schedule profile information of the rule, vendor of the rule, target device of the rule. In another embodiment, the user interface views of the firewall support module 212 is configured to provide an option to the one or more user's 102A-N to extensively search a rule/policy based details of the firewall devices using following keywords: (a) devicename (Device Name), (b) Source (e.g., Source IP), (c) Destination (e.g., Destination IP), (d) Service, (e) Action, and (f) Policy (i.e. Policy name). For example, when the one or more users 102A-N provide the keywords as devicename: de02fw01*AND ((source:190.* OR destination:190.*) AND (service: tcp-80 AND action: Deny)) in the search criteria, the rules that match the search criteria are listed in the user interface views of the firewall support module 212. In one embodiment, the one or more users 102A-N tag the rules that match the search criteria/query to the application ID (e.g., AppView ID) to manage the rules. The user interface views of the firewall support module 212 provide an option to the one or more user's 102A-N to perform the one or more actions on the rules of the firewall devices (e.g. create/update the rules, delete the rules, and etc.).

FIG. 7 illustrates a user interface view of the certificate support module 214 according to an embodiment herein. The user interface view of the certificate support module 214 provides an option to the one or more user's 102A-N to search for details of a certificate with a common name 704, and/or a subject alternate name. The user interface view of the certificate support module 214 is configured to display the search results (i.e. a list of certificates) that match the search query/criteria. In one embodiment, the user interface view of the certificate support module 214 includes details of a certificate as follows: (i) the common name of the certificate 704, (ii) a certificate group 706, (iii) validity details of the certificate 708, (iv) a status of the certificate 710, (v) a key algorithm and size of the certificate 710, and a compliance status of the certificate 712. In one embodiment, the user interface view of the certificate support module 214 displays a holistic view of the chain structure of the certificate, and/or device details of the certificate, when the one or more users 102A-N select at least one certificate from the search results (i.e. a list of certificates in the certificate tab). In one embodiment, the user interface view of the certificate support module 214 provides an option to the one or more users 102A-N to perform actions on the certificates (e.g., pushing/renewing a certificate) that are listed as search results on granular object level.

FIG. 8 illustrates a user interface view of the DNS support module 216 according to an embodiment herein. The user interface view of the DNS support module 216 provides an option to the one or more user's 102A-N to search for DNS records extensively. The user interface view of the DNS support module 216 is configured to display a list of DNS records that match the search query/criteria. In one embodiment, the user interface view of the DNS support module 216 includes details of the DNS records as follows: (i) a host name of the DNS record 804, (ii) Time to Live (TTL) of the DNS record 806, (iii) a type of the DNS record 808, (iv) a value of the DNS record 810, (v) a zone name of the DNS record 804, and (vi) an application ID (e.g., an AppView ID) of the DNS record 812. In one embodiment, when the one or more users 102A-N selects a DNS record from the list of DNS records from the DNS tab (i.e. search results), the user interface view of the DNS support module 216 displays details (i.e. a chain structure, and/or a device details) of the selected DNS record in a grid view. In one embodiment, the user interface view of the DNS support module 216 provides options to the one or more users 102A-N to perform actions, on granular object level, on the DNS records that are listed in the as search results. In another embodiment, the one or more actions include create/modify/delete the DNS records (e.g. updating the change in the Internet Protocol to DNS server using an application provisioning form).

Figure 9:
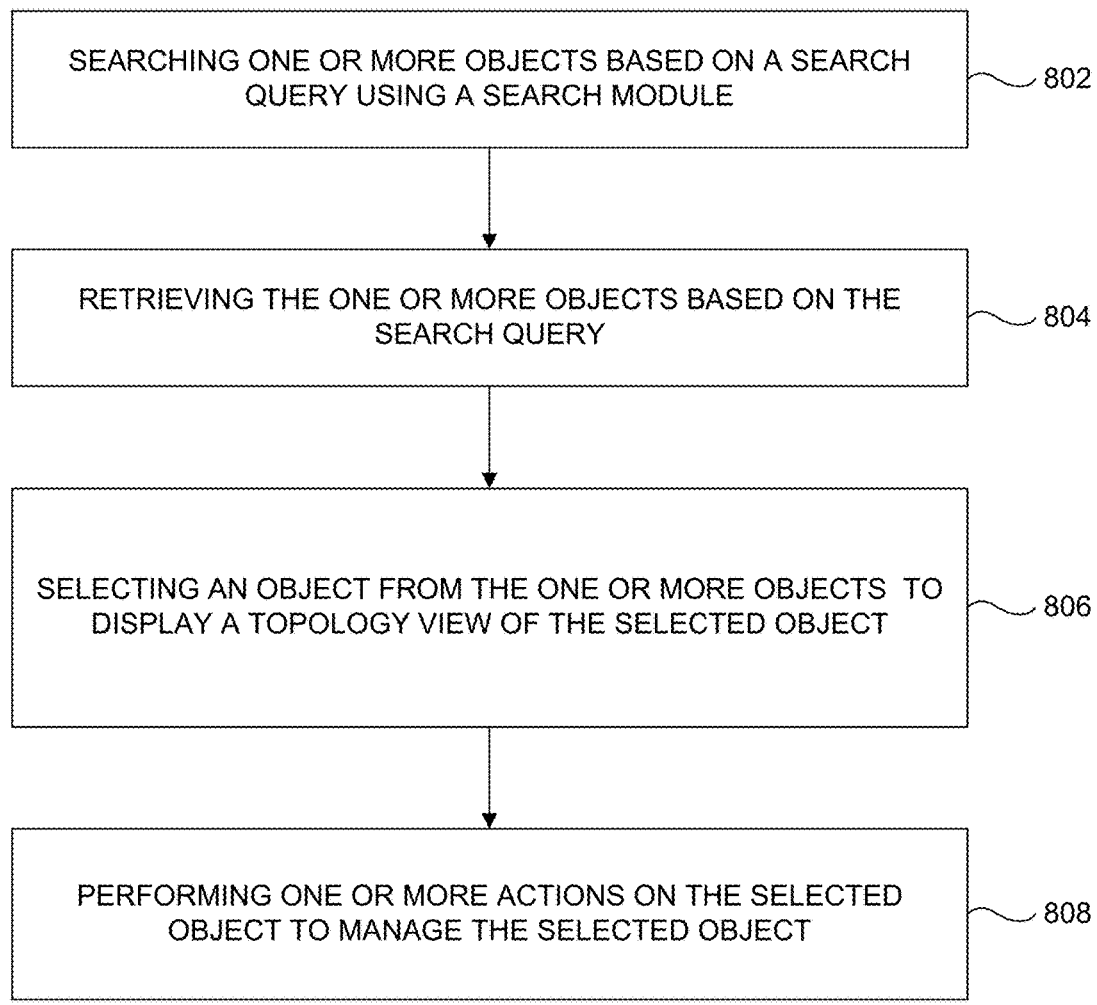
FIG. 9 is a flow diagram illustrating a computer implemented method for managing one or more objects across one or more datacenters using the control center system of FIG. 1 according to an embodiment herein.

FIG. 9 is a flow diagram illustrating a computer implemented method for managing one or more objects 112A1-Nn in one or more datacenters 110A-N using the control center system 106 of FIG. 1 according to an embodiment herein. In step 802, the one or more objects 112A1-Nn (i.e. objects of the ADC devices, firewall devices, rules of the firewall devices, DNS records, and/or certificates) are searched based on a search query using a search module 204. In step 804, the one or more objects 112A1-Nn are retrieved based on the search query using the search module 204. In step 806, when an object 112 is selected from the one or more objects 112A1-Nn, the topology view module 206 displays a topology view of the selected object 112. In step 808, one or more actions are performed on the selected object 112 to manage the selected object 112. In one embodiment, the one or more actions includes (a) enabling the selected object, (b) disabling the selected object, (c) viewing configurations of the selected object, (d) backing up and restoring the selected object, and (e) tagging the selected object to an application ID to manage the selected object. The method may further include the step of backing up and restoring a device (e.g., an ADC device).

The one or more objects 112A1-Nn may include at least one of (i) an object of the ADC device, (ii) a rule of a firewall device, (iii) a certificate, and (iv) a domain name system (DNS) record. In one embodiment, the method further includes the following steps: (i) searching at least one of (a) one or more objects of the ADC devices based on the search query, (b) one or more rules, or one or more policies of the firewall devices based on the search query, (c) one or more certificates based on the search query, and (d) one or more DNS records based on the search query; and (ii) retrieving at least one of (a) the one or more objects of the ADC devices based on the search query, (b) the one or more rules, or the one or more policies of the firewall devices based on the search query, (c) the one or more certificates based on the search query, and (d) the one or more DNS records based on the search query. In another embodiment, when an object of the ADC device is selected from the search result (i.e. a list of objects of the ADC devices), the topology view module 206 displays at least one of (i) a parent object, (ii) a first child of the parent object, and (ii) a second child of the parent object associated with the selected object of the ADC device in a hierarchy. In yet another embodiment, when a certificate is selected from the one or more certificates, the certificate support module 214 displays a holistic view of the selected certificate. The holistic view may include details such as (a) a chain structure of the selected certificate, and (b) device details of the selected certificate.

Figure 10:
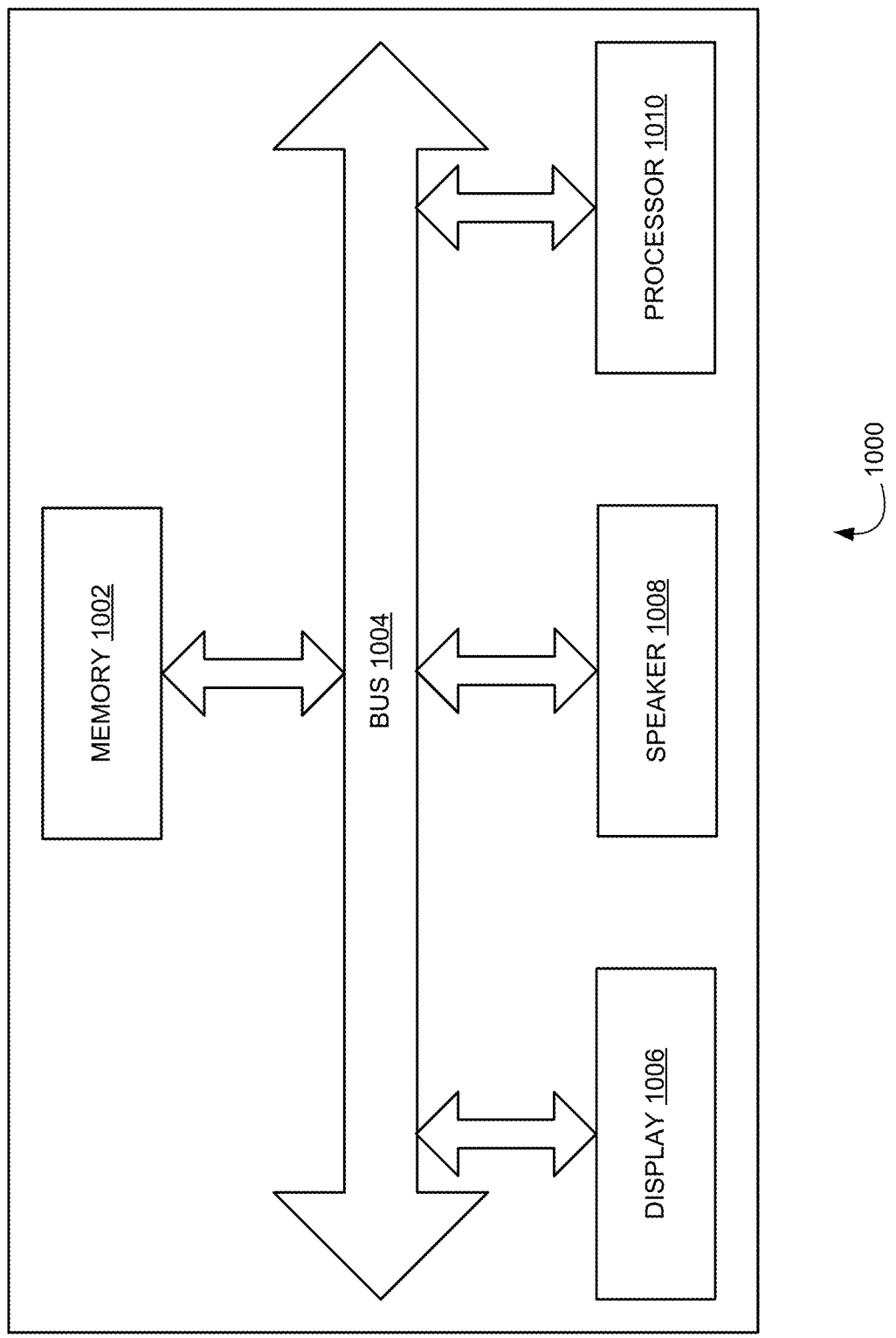
FIG. 10 illustrates an exploded view of a receiver according to an embodiment herein.

FIG. 10 illustrates an exploded view of a receiver 1000 having a memory 1002 having a set of instructions, a bus 1004, a display 1006, a speaker 1008, and a processor 1010 capable of processing the set of instructions to perform any one or more of the methodologies herein, according to an embodiment herein. The processor 1010 may also enable digital content to be consumed in the form of video for output via one or more displays 1006 or audio for output via speaker and/or earphones 1008. The processor 1010 may also carry out the methods described herein and in accordance with the embodiments herein.

Digital content may also be stored in the memory 1002 for future processing or consumption. The memory 1002 may also store program specific information and/or service information (PSI/SI), including information about digital content (e.g., the detected information bits) available in the future or stored from the past. A user of the receiver 1000 may view this stored information on display 1006 and select an item of for viewing, listening, or other uses via input, which may take the form of keypad, scroll, or other input device(s) or combinations thereof. When digital content is selected, the processor 1010 may pass information. The content and PSI/SI may be passed among functions within the receiver using the bus 1004.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 11:
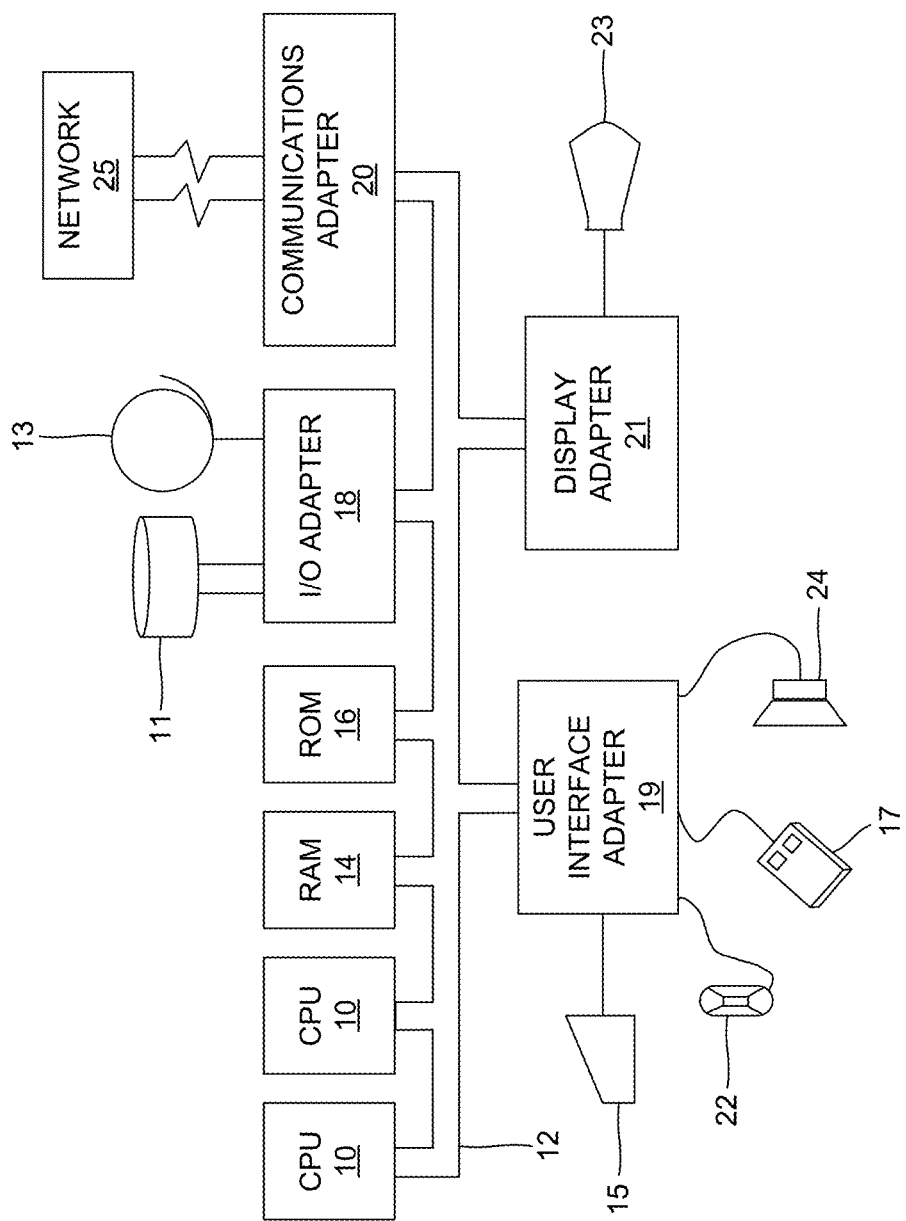
FIG. 11 illustrates a schematic diagram of a computer architecture used according to an embodiment herein.

A representative hardware environment for practicing the embodiments herein is depicted in FIG. 11. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The control center system 106 allows the one or more user's 102A-N to search and retrieve the one or more objects 112A1-Nn to perform one or more actions on a granular object level. The control center system 106 allows the one or more user's 102A-N to search the one or more objects 112A1-Nn by a free text entity, a keyword, and a logical operator. The control center system 106 displays a topology view of the one or more objects in a hierarchy. The topology view navigates the one or more user's 102A-N to the required page to perform the one or more actions on the one or more objects 112A1-Nn. The control center system 106 provides a holistic view of a selected object to allow the one or more user's 102A-N to perform the one or more actions on the selected object.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A control center system for managing a plurality of objects that is specific to an application on granular object level across a plurality of data centers by generating a topological view for said plurality of objects, said control center system comprising:
    a memory that stores a database; and
    a processor configured to
        search and retrieve a plurality of objects that is specific to said application based on a search query, wherein said plurality of objects that is specific to said application comprises a plurality of Application Delivery Controller (ADC) objects associated with a plurality of Application Delivery Controller (ADC) devices, and at least one of (i) a plurality of rules and policies of a plurality of firewall devices, (ii) a plurality of certificates or (iii) a plurality of domain name system (I)NS) records;
        map (i) at least one of (a) a parent object, (b) a first child of said parent object, or (c) a second child of said parent object with said plurality of ADC objects associated with said plurality of ADC devices, and at least one of
            (ii) details of said plurality of rules and policies with said plurality of rules and policies of said plurality of firewall devices,
            (iii) at least one of (a) a chain structure of said plurality of certificates, or (b) device details of said plurality of certificates with said plurality of certificates, or
            (iv) at least one of (a) a chain structure, or (b) device details of said plurality of domain name systems (DNS) with said plurality of domain name systems;
        provide an option to a user to select any one application specific object from said plurality of application specific objects;
        automatically generate a topological view for said selected application specific object based on the mapping of said selected application specific object; and
        perform a plurality of actions on said granular object level in said topological view to manage at least one of
            (i) an ADC device when said selected application specific object is said ADC object of said plurality of ADC devices, wherein said plurality of actions associated with said ADC device comprises at least one of (a) enabling and disabling said selected ADC object of said ADC device, (b) viewing configurations of said selected ADC object, (c) backing up and restoring said selected ADC object, or (d) tagging said selected ADC object to an application ID to manage said selected ADC object of said ADC device,
(ii) a rule or policy of said plurality of firewall devices when said selected application specific object is said rule or said policy of said plurality of firewall devices, wherein said plurality of actions associated with said plurality of firewall devices comprises at least one of (a) creating a new rule or a new policy for said plurality of firewall devices, (b) updating said rule or policy of said plurality of firewall devices, (c) deleting said rule or policy of said plurality of firewall devices or (d) tagging said plurality of rules of said plurality of firewall devices to an application ID to manage said plurality of rules of said firewall device,
(iii) a certificate when said selected application specific object is said certificate, wherein said plurality of actions associated with said certificate comprises at least one of (a) pushing said certificate, or (b) renewing said certificate to manage said certificate, or
(iv) a DNS record when said selected application specific object is said domain name system, wherein said plurality of actions associated with said DNS record comprises at least one of (a) creating said DNS record, (b) modifying said DNS record, or (c) deleting said DNS record to manage said DNS records.

2. The control center system of claim 1, wherein said processor is configured to provide details of said plurality of rules associated with said plurality of firewall devices, wherein said details of said plurality of rules comprises at least one of (i) a rule name, (ii) a source network object of a rule, (iii) a destination network object of a rule, (iv) applications/services, (v) an action taken on a rule, (vi) log settings of a rule, (vii) details of installation of a rule/policy in said firewall device, (viii) a policy name of a rule, or (ix) an application ID of a rule.

3. The control center system of claim 2, wherein said processor is configured to tag at least one of (i) said plurality of rules, and (ii) said plurality of policies that matches said search query to an application ID to manage at least one of (i) said plurality of rules, or (ii) said plurality of policies of said plurality of firewall devices.

4. The control center system of claim 1, wherein said processor is configured to search and retrieve said plurality of certificates based on at least one of (i) a common name of a certificate, or (ii) a subject alternate name of a certificate.

5. The control center system of claim 4, wherein said processor is configured to provide details of said plurality of certificates, wherein said details of said plurality of certificates comprise at least one of (i) a common name of a certificate, (ii) a certificate group of said certificate, (iii) validity details of said certificate, and (iv) a status of said certificate, (v) a key algorithm and size of said certificate, or (vi) a compliance status of said certificate.

6. The control center system of claim 1, wherein said processor is configured to provide hints to optimize said search query to retrieve said search results.

7. The control center system of claim 6, wherein said system comprises (i) a full text search field, (ii) a keyword search field, (iii) a logical operator search field, and (iv) a frequent search field to provide said hints to optimize said search query.

8. A non-transitory program storage device readable by computer, and comprising a program of instructions executable by said computer to perform a method for managing a plurality of objects that is specific to an application on granular object level across a plurality of datacenters by generating a topological view for said plurality of objects, wherein said plurality of objects comprises a plurality of Application Delivery Controller (ADC) objects associated with a plurality of ADC devices and at least two of (i) a plurality of rules/policies associated with firewall devices, (ii) a plurality of certificates, or (iii) a plurality of domain name system (DNS) records, said method comprising:
    searching said plurality of ADC objects associated with said plurality of ADC devices, and at least two of (i) said plurality of rules/policies associated with said firewall devices, (ii) said plurality of certificates, or (iii) said plurality of domain name system (DNS) records based on a search query;
    retrieving said plurality of ADC objects associated with said plurality of ADC devices, and at least two of (i) said plurality of rules/policies associated with said firewall devices, (ii) said plurality of certificates, or (iii) said plurality of domain name system (DNS) records based on said search query;
    mapping (i) at least one of (a) a parent object, (b) a first child of said parent object, or (c) a second child of said parent object with said plurality of ADC objects associated with said plurality of ADC devices, and
    at least two of
        (ii) details of said plurality of rules and policies with said plurality of rules and policies of said plurality of firewall devices,
        (iii) at least one of (a) a chain structure of said plurality of certificates, or (b) device details of said plurality of certificates with said plurality of certificates, or
        (iv) at least one of (a) a chain structure, or (b) device details of said plurality of domain name systems (DNS) with said plurality of domain name systems
    providing an option to a user to select any one application specific object from said plurality of application specific objects;
    automatically generating a topological view for said selected application specific object based on the mapping of said selected application specific object; and
    performing a plurality of actions on said granular object level in said topological view to manage at least one of
        (i) an ADC device when said selected application specific object is said ADC object of said plurality of ADC devices, wherein said plurality of actions associated with said ADC device comprises at least one of (a) enabling and disabling said selected ADC object of said ADC device, (b) viewing configurations of said selected ADC object, (c) backing up and restoring said selected ADC object, or (d) tagging said selected object to an application ID to manage said selected ADC object of said ADC device,
        (ii) a rule and a policy of said plurality of firewall devices when said selected application specific object is said rule or said policy of said plurality of firewall devices, wherein said plurality of actions associated with said plurality of firewall devices comprises at least one of (a) creating a new mile or a new policy for said plurality of firewall devices, (b) updating said rule or policy of said plurality of firewall devices, (c) deleting said rule or policy of said plurality of firewall devices or (d) tagging said plurality of rules of said plurality of firewall devices to an application ID to manage said plurality of rules of said firewall device, (iii) a certificate when said selected application specific object is said certificate, wherein said plurality of actions associated with said certificate comprises at least one of (a) pushing said certificate, or (b) renewing said certificate to manage said certificate, or (iv) a DNS record when said selected application specific object is said domain name system, wherein said plurality of actions associated with said DNS record comprises at least one of (a) creating said DNS record, (b) modifying said DNS record, or (c) deleting said DNS record to manage said DNS records.

9. A computer implemented method for managing a plurality of objects that is specific to an application on granular object level across a plurality of datacenters by generating a topological view for said plurality of objects, wherein said plurality of objects comprises (i) a plurality of Application Delivery Controller (ADC) objects associated with a plurality of ADC devices, (ii) a plurality of rules/policies associated with firewall devices, (iii) a plurality of certificates, and (iv) a plurality of domain name system (DNS) records, said method comprising:

searching (i) said plurality of ADC objects associated with said plurality of ADC devices, (ii) said plurality of rules/policies associated with said firewall devices, (iii) said plurality of certificates, and (iv) said plurality of domain name system (DNS) records based on a search query;

retrieving (i) said plurality of ADC objects associated with said plurality of ADC devices, (ii) said plurality of rules/policies associated with said firewall devices, (iii) said plurality of certificates, and (iv) said plurality of domain name system (DNS) records based on said search query;

mapping (i) at least one of (a) a parent object, (b) a first child of said parent object, or (c) a second child of said parent object with said plurality of ADC objects associated with said plurality of ADC devices, (ii) details of said plurality of rules and policies with said plurality of rules and policies of said plurality of firewall devices, (iii) at least one of (a) a chain structure of said plurality of certificates, or (b) device details of said plurality of certificates with said plurality of certificates and (iv) at least one of (a) a chain structure, or (b) device details of said plurality of domain name systems (DNS) with said plurality of domain name systems providing an option to a user to select any one application specific object from said plurality of application specific objects;

automatically generating a topological view for said selected application specific object based on the mapping of said selected application specific abject; and performing a plurality of actions on said granular object level in said topological view to manage at least one of (i) an ADC device when said selected application specific object is said ADC object of said plurality of ADC devices, wherein said plurality of actions associated with said ADC device comprises at least one of (a) enabling and disabling said selected ADC object of said ADC device, (b) viewing configurations of said selected ADC object, (c) backing up and restoring said selected ADC object, or (d) tagging said selected object to an application ID to manage said selected ADC object of said ADC device, (ii) a rule and said policy of said plurality of firewall devices when said selected application specific object is said rule or said policy of said plurality of firewall devices, wherein said plurality of actions associated with plurality of said firewall devices comprises at least one of (a) creating a new rule or a new policy for said plurality of firewall devices, (b) updating said rule or policy of said plurality of firewall devices, (c) deleting said rule or policy of said plurality of firewall devices or (d) tagging said plurality of rules of said plurality of firewall devices to an application ID to manage said plurality of rules of said firewall device, (iii) a certificate when said selected application specific object is said certificate, wherein said plurality of actions associated with said certificate comprises at least one of (a) pushing said certificate, or (b) renewing said certificate to manage said certificate, or (iv) a DNS record when said selected application specific object is said domain name system, wherein said plurality of actions associated with said DNS record comprises at least one of (a) creating said DNS record, (b) modifying said DNS record, or (c) deleting said DNS record to manage said DNS records.

* * * * *